United States Patent
Murray

(10) Patent No.: US 8,270,678 B2
(45) Date of Patent: Sep. 18, 2012

(54) METHOD, SYSTEM, AND COMPUTER PROGRAM PRODUCT TO DETECT MICRON SCALE DISPLACEMENT OF OBJECTS FROM A LONG RANGE WITH AND OPTICAL DEVICE AND RELATED COMPUTER IMPLEMENTED METHODS

(75) Inventor: Robert Carl Murray, Rotterdam, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 679 days.

(21) Appl. No.: 12/492,987

(22) Filed: Jun. 26, 2009

(65) Prior Publication Data

US 2010/0328070 A1     Dec. 30, 2010

(51) Int. Cl.
*G06K 9/00* (2006.01)
(52) U.S. Cl. .................. 382/107; 382/103; 382/128
(58) Field of Classification Search .......... 382/103, 382/107, 128; 348/51, 90, 169, 154, 155; 356/27; 73/488; 324/307; 340/568
See application file for complete search history.

(56) References Cited

U.S. PATENT DOCUMENTS

| | | | |
|---|---|---|---|
| 4,687,942 A | 8/1987 | Takagi et al. | |
| 5,056,046 A | 10/1991 | Mutchler et al. | |
| 5,736,857 A * | 4/1998 | Taft | 324/309 |
| 6,626,361 B2 | 9/2003 | Hileman | |
| 6,995,673 B1 | 2/2006 | Osredkar et al. | |
| 7,151,568 B2 | 12/2006 | Kawachi et al. | |
| 7,805,009 B2 * | 9/2010 | Everett et al. | 382/218 |
| 8,019,121 B2 * | 9/2011 | Marks et al. | 382/103 |
| 2010/0149518 A1 * | 6/2010 | Nordenfelt et al. | 356/4.01 |

OTHER PUBLICATIONS

B. Serio, J. J. Hunsinger, D. D. Teyssieux, B. Cretin; Phase correlation method for subpixel in-plane vibration measurements of MEMS by stroboscopic microscopy (Proceedings Paper); SPIEDigitalLibrary; Proceedings vol. 5856; Optical Measurement Systems for Industrial Inspection IV, Wolfgang Osten, Christphe Gorecki; Erik L. Novak; Editors, pp. 755-762 (Abstract) http://spie.org, Jun. 13, 2005.

* cited by examiner

*Primary Examiner* — Ali Bayat
(74) *Attorney, Agent, or Firm* — Bracewell & Giuliani LLP

(57) ABSTRACT

Embodiments of systems, program products, and computer implemented methods to measure the displacement of an object located in a hazardous or otherwise inaccessible location at a long range from an optical device with micron-level accuracy are provided the object being. The objects can be machinery, valves, containers, or any other object whose displacement is to be measured. The object can be located in radioactive, chemically reactive, high voltage, or otherwise hazardous or inaccessible locations that are not accessible for conventional displacement measurement by personnel. A system can comprise an identifier on the object to be tracked, an optical device, an computer with at least processing, storage, and memory facilities, and a communications network.

25 Claims, 6 Drawing Sheets

METHOD, SYSTEM, AND COMPUTER PROGRAM PRODUCT TO DETECT MICRON SCALE DISPLACEMENT OF OBJECTS FROM A LONG RANGE WITH AND OPTICAL DEVICE AND RELATED COMPUTER IMPLEMENTED METHODS

BACKGROUND OF THE INVENTION

1. Field of the Invention

The present invention relates to measuring the displacement of an object, and specifically to systems, program product, and methods to determine the displacement of objects at a long range.

2. Description of Related Art

Determining the displacement of objects can be accomplished by various approaches. One approach is to use a measuring device such as a ruler or micrometer to measure an object's displacement at close range. These measuring devices, however, may not provide the required accuracy. Generally, displacement sensors can also be utilized to measure the displacement of an object. U.S. Pat. No. 7,151,568 describes a displacement sensor that uses a standard imaging unit such as a digital camera to capture images of an object that are then processed to measure the object's displacement. These displacement sensors can be costly. Further, such cameras are limited to focusing on the movement of an object within the field of view that is less than one inch. Accurate and precise displacement measurement of objects in hazardous or inaccessible locations, even with humans wearing protective clothing, are impossible or impractical under these approaches and can be costly, dangerous, or inaccurate. Cameras have also been used to track movement in a valve component as shown, for example, in U.S. Pat. No. 5,056,046 and to acquire data from bar codes affixed to containers as shown, for example, in U.S. Pat. No. 6,626,361. Further, laser range finders can be used to measure displacement. Such devices, however, only measure distance parallel (depth) to the line of sight. Further, laser recoil off the target object can provide inaccurate measurements.

Recognized by the inventor is that the ability to measure displacement of objects such as machinery, valves, and containers that is perpendicular to the line of sight without contacting them is valuable, for example, because the objects can then be moved or returned to a desired position based on that measurement. This is especially valuable where the displacement can be relatively large but nevertheless must be known with micron accuracy, and where the objects of interest are located in radioactive, chemically reactive, high voltage, or other hazardous locations, and thus are not accessible for displacement measurement by personnel. Of further value is the ability of a system to determine displacement measurements where the movement of the object in the field of view ranges from a fraction of an inch to approximately 2 inches or more.

A need, therefore, exists for a system, program product, and computer implemented method to perform algorithms that can accurately determine the displacement, with micron accuracy, of objects located in a hazardous or inaccessible location and at a long range from an optical viewing device.

SUMMARY OF THE INVENTION

In view of the foregoing, various embodiments of the present invention advantageously provide a system, program product, and methods to perform algorithms that can accurately, safely, economically, and in a simplified manner, determine the displacement, for example, with micron-level accuracy, of objects located, for example, in a hazardous or inaccessible location and at a long range from an optical viewing device. For example, according to various embodiments of the present invention an optical device can obtain images of an object located in a hazardous or inaccessible location and determine the displacement of that object from a safe location. Various embodiments of the present invention improve upon application of the Cauchy-Shwartz Cross-Correlation algorithm by providing a more efficient mechanism to automatically take the peak cross-correlation coefficient results and determine the pixel value within $1/100^{th}$ of a pixel accuracy, or alternatively 0.02 micron accuracy, where the peak for the cross-correlation coefficient occurs.

More specifically, an example of a system to accurately determine the displacement, with micron accuracy, of objects to be tracked located in a hazardous or inaccessible location according to an embodiment of the present invention can include an optical viewing device and an object displacement detector computer. Particularly, according to this example, the optical viewing device can be a digital camera or a charge coupled device ("CCD") located at a long range from the object located, for example, in a hazardous or inaccessible location, and is remote from and in communication with the object displacement detector computer. A long range distance can vary but is typically, for example, 100 yards to approximately 1000 yards.

The object displacement detector computer, may, for example, have a processor, a computer readable storage medium, a memory element, a graphical user interface and input device, and at least one database stored in the computer readable storage medium. The object displacement detector computer can be calibrated, for example, to capture images taken by the camera of an identifier located on the object to be tracked, preprocess the images, store the image data in a first database, cross-correlate the images to determine the object's displacement, and store the displacement data in a second database. According to this exemplary embodiment of the present invention, the at least one database can include first and second databases. The first database can include, for example, a plurality of image data files stored therein. The second database can include, for example, a plurality of displacement data files stored therein.

In this exemplary embodiment, the identifier located on the object to be tracked and an identifier located on a fixed reference surface, can have, for example, an adhesive on one side to provide a means for attachment. The identifiers can alternatively be painted or engraved onto the surface, of an object or a fixed surface. The identifier on the object to be tracked side to be imaged by the optical device includes a set of darkened, generally rectangular stripes having random widths that can be spaced randomly. The generally rectangular stripes of random widths with random spacing can prevent interference between the stripe spacing and the image pixels of the optical device. The identifier located on the fixed reference surface provides, for example, a reference image that can be processed in a similar way to the identifier located on the object to be tracked. The processing results for the identifier located on the fixed reference surface can thus be subtracted from those for the object's identifier to account for noise and optical device movement.

According to this exemplary embodiment of the present invention, the optical device, for example, in the form of a camera, can be placed remote from and in communication with the object displacement detector computer. The camera can take images of the identifiers on both the object to be tracked and the fixed reference surface. The camera communicates the image data of the identifiers to the object displacement detector computer for processing and storage. In this way the object displacement detector computer is calibrated with the identifier located on the object to ultimately measure the object's displacement.

Furthermore, this exemplary embodiment of the system can also include, for example, a computer readable program product, readable by the object displacement detector computer and stored in the memory element of the object displacement detector computer. The computer readable program product, readable by the object displacement detector computer can, for example, include two main component parts, an image module and a displacement calculation module. The image module can include, for example, an image capturer and the displacement calculation module can include, for example, an image preprocessor and an image cross-correlator.

The image module in this example can include an image capturer to capture the image data of the identifiers on the object and the fixed reference surface taken by the optical device. The image capturer is adapted to convert the images of the identifiers into an arrays that can be represented as numerical functions based on the pixels occupied by the stripes on the identifiers.

The displacement calculation module in this example includes an image preprocessor to perform the operations of smoothing the image numerical functions by removing image vectors that produce spurious peaks to facilitate the identification of peak values during cross-correlation. Also included in the displacement calculation module, in this example, is an image cross-correlator adapted to perform the operations of comparing a function portion extracted from a first numerical function for an identifier to a subsequent numerical function of the same identifier. The image cross-correlator is further adapted to calculate and identify the peak correlation value between the function portion extracted from the first numerical function and the subsequent numerical function as the extracted function portion is shifted pixel by pixel in one axis. Once the relative pixel location corresponding to the peak correlation value is identified, the image cross-correlator can perform the operations of curve-fitting a polynomial around the peak correlation value to ascertain a refined pixel location within $1/100^{th}$ of a pixel accuracy that corresponds to a refined peak correlation value. The refined pixel location can then be used to determine the number of pixels the object moved and, in this example, the number of pixels can then be multiplied by a factor of a unit of measurement per pixel to obtain a displacement in units such as inches or centimeters.

The images and image data files, in this example, can be stored in the first database for access as required by the object displacement detector computer. The resulting displacement data, in this example, can be stored in the second database for access as required by the object displacement detector computer. The data stored in both the first and second databases, in this example, is accessible to the user computer via the communications network.

In another exemplary embodiment, a user computer, for example, can be placed remote from and in communication with the object displacement detector computer via a communications network. Further, the optical device can communicate with the object displacement detector computer via a communications network. In this example, the user computer can have a processor, a memory element, and a user interface device that allows the user to transmit through the communications network a command or set of commands that instruct the optical device to image the identifiers located on the object and the fixed reference surface to thereby initiate the displacement measurement process in the object displacement detector computer.

BRIEF DESCRIPTION OF THE DRAWINGS

So that the manner in which the features and advantages of the invention, as well as others which can become apparent, may be understood in more detail, a more particular description of the invention briefly summarized above may be had by reference to the various embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well. The drawings are not necessarily to scale. Certain features of the disclosure may be shown exaggerated in scale or in somewhat schematic form and some details of conventional elements may not be shown in the interest of clarity and conciseness.

DETAILED DESCRIPTION

Figure 1:
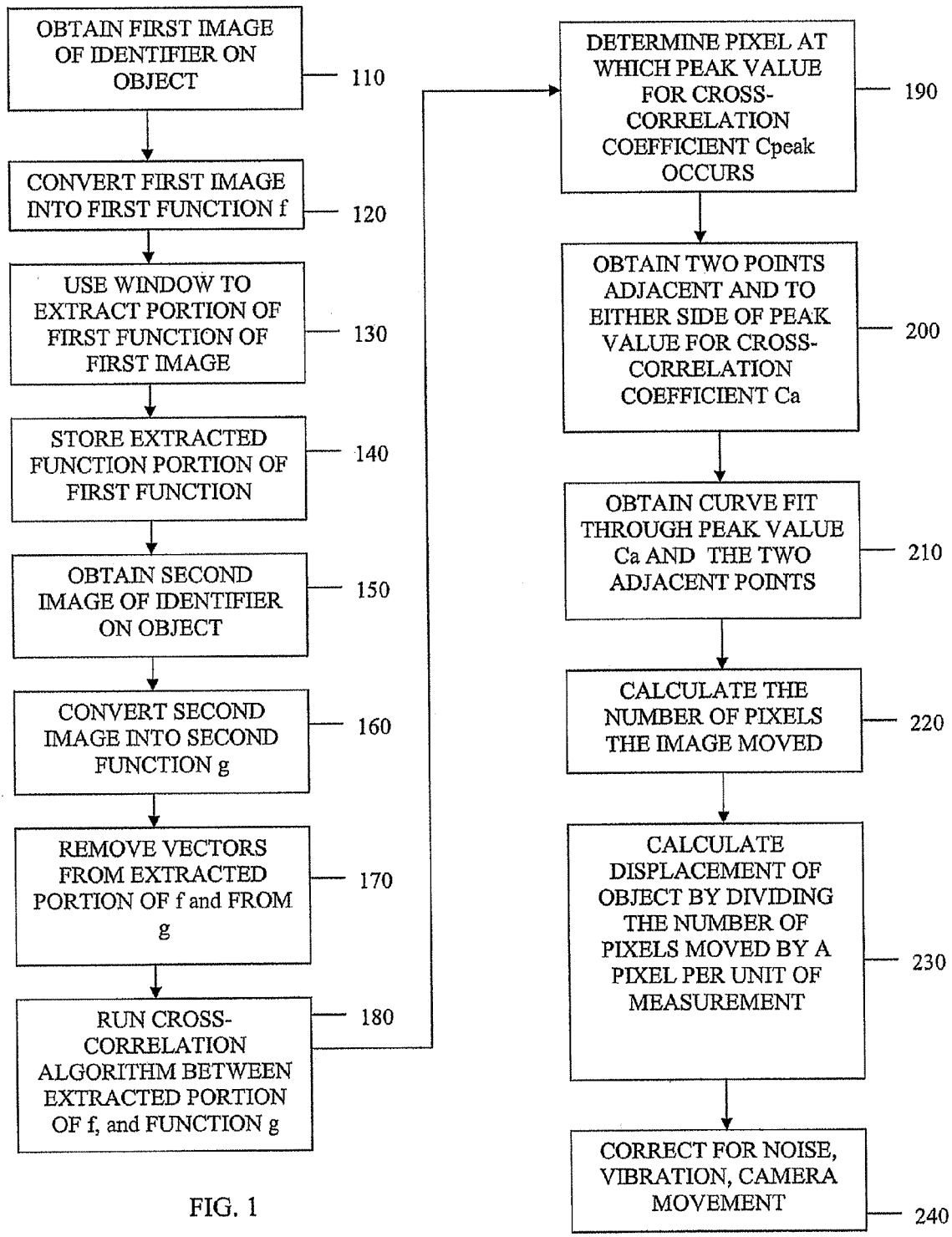
FIG. 1 is a schematic block flow diagram illustrating steps or operations of facilitating the measurement of the displacement of an object with micron-level accuracy in accordance with an embodiment of the present invention.

The present invention now will be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout. It is to be fully recognized that the different teachings of the embodiments discussed below may be employed separately or in any suitable combination to produce desired results.

Various embodiments of the present invention provide systems, computer program products, and related computer implemented methods to measure the displacement of an object, located in a hazardous or otherwise inaccessible location at a long range from an optical device with micron-level ($1/100^{th}$ of a pixel) accuracy. Various embodiments of the present invention provide systems, computer program products, and related computer implemented methods to allow personnel, for example, to determine the displacement of an object located in a hazardous or inaccessible location from a long range and with micron-level accuracy. The objects can be, for example, machinery, valves, containers, or any other object whose displacement is to be measured. The object can be located, for example, in radioactive, chemically reactive, high voltage, or otherwise hazardous or inaccessible locations that are not accessible for conventional displacement measurement by personnel.

To provide context, it is useful to understand that an algorithm can be used to determine how closely two images resemble or correlate with each other and thus can allow measurement of displacement. Given these two images, a window in the first image can be selected and it can then be determined how far that window must be shifted to obtain a peak correlation in the second image. As an analogy, if a race car drives through the field of view and two images are taken, the race car can be located in image one. The race car would be the windowed portion of the first image. It can then be determined how far that portion of the image containing the race car must be shifted to overlap the race car in image two.

This correlation between two portions of data can be expressed as a cross correlation coefficient and is based on the Cauchy-Schwartz inequality, can be written as follows:

$$C_\Delta = \frac{\sum_{i=w_1}^{w_1+n} f_i g_{i+\Delta}}{\sqrt{\left(\sum_{i=w_1}^{w_1+n} f_i^2\right)\left(\sum_{i=w_1}^{w_1+n} g_{i+\Delta}^2\right)}} \quad (1)$$

The denominator in this form can require extensive computational resources to evaluate at each offset, $\Delta$, with little value in improving accuracy and thus is often neglected. Essentially, the summation in the above is over a window of width n in image function "f", and offset by $\Delta$ in image function "g." At each offset, n floating point operations are required to evaluate the numerator. Evaluating the numerator at n different offsets would then require on the order of $n^2$ operations. A more efficient evaluation of the numerator, however, can be performed by using three Fast Fourier Transforms ("FFTs"):

$$f*g = \sum_{i=w_1}^{w_1+n} f_i g_{i+\Delta} = \mathfrak{I}^{-1}\{\mathfrak{I}(f)\mathfrak{I}(g)^*\} \quad (2)$$

where each FFT requires on the order $n \log_2(n)$ operations. For large n, the $n \log_2(n)$ is much less than $n^2$, and thus, is more efficient.

The first term in the denominator of Eq. 1 is not computationally intensive. It requires n operations to evaluate the sum of $f^2$ at each location in window w:

$$N_f = \sum_{i=w_1}^{w_1+n} f_i^2 = f^2 \cdot w \quad (3)$$

The second term in the denominator is, however, computationally expensive. It can require n operations to determine the sum of the squares of the values of g in window w, and must be evaluated for each offset $\Delta$. Although there are other efficient ways to evaluate this second term in the denominator, it can be reduced by using an FFT-based correlation with w:

$$N_g(\Delta) = \sum_{i=w_1}^{w_1+n} g_{i+\Delta}^2 = g^2 * w \quad (4)$$

Thus, we can restate Eq. 1 and express the final efficient cross-correlation algorithm using correlations for the otherwise computationally expensive parts, as shown below:

$$C_\Delta = \frac{\sum_{i=w_1}^{w_1+n} f_i g_{i+\Delta}}{\sqrt{\left(\sum_{i=w_1}^{w_1+n} f_i^2\right)\left(\sum_{i=w_1}^{w_1+n} g_{i+\Delta}^2\right)}} = \frac{(f \cdot w)*g}{\sqrt{(f^2 \cdot w)(g^2 * w)}} \quad (5)$$

With this algorithm now developed for application to various embodiments of the present invention, the embodiments can be addressed more effectively.

Figure 5:
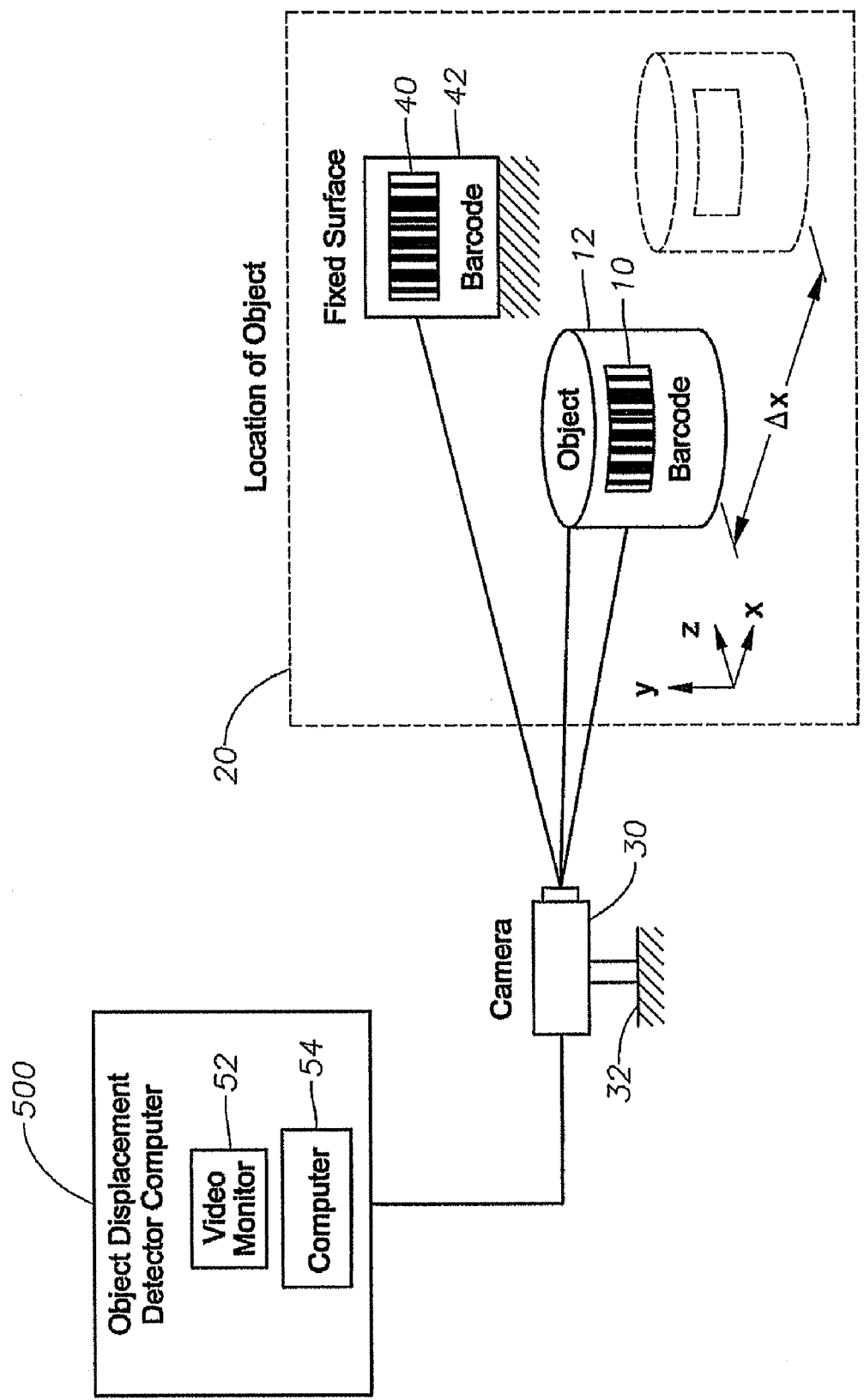
FIG. 5 illustrates a simplified system to measure the displacement of an object located in a hazardous or otherwise inaccessible location in accordance with an embodiment of the present invention.

FIG. 1, is a schematic block flow diagram of an example of a computer implemented method to measure the displacement of an object located at a long range with micron-level accuracy according to an embodiment of the present invention. FIG. 5 is an example of a system for measuring the displacement of an object located at a long range with micron-level accuracy by tracking images of an identifier located on the object, according to an embodiment of the present invention. The identifier can alternatively be painted or engraved onto the surface of an object or a fixed reference surface.

Figure 6:
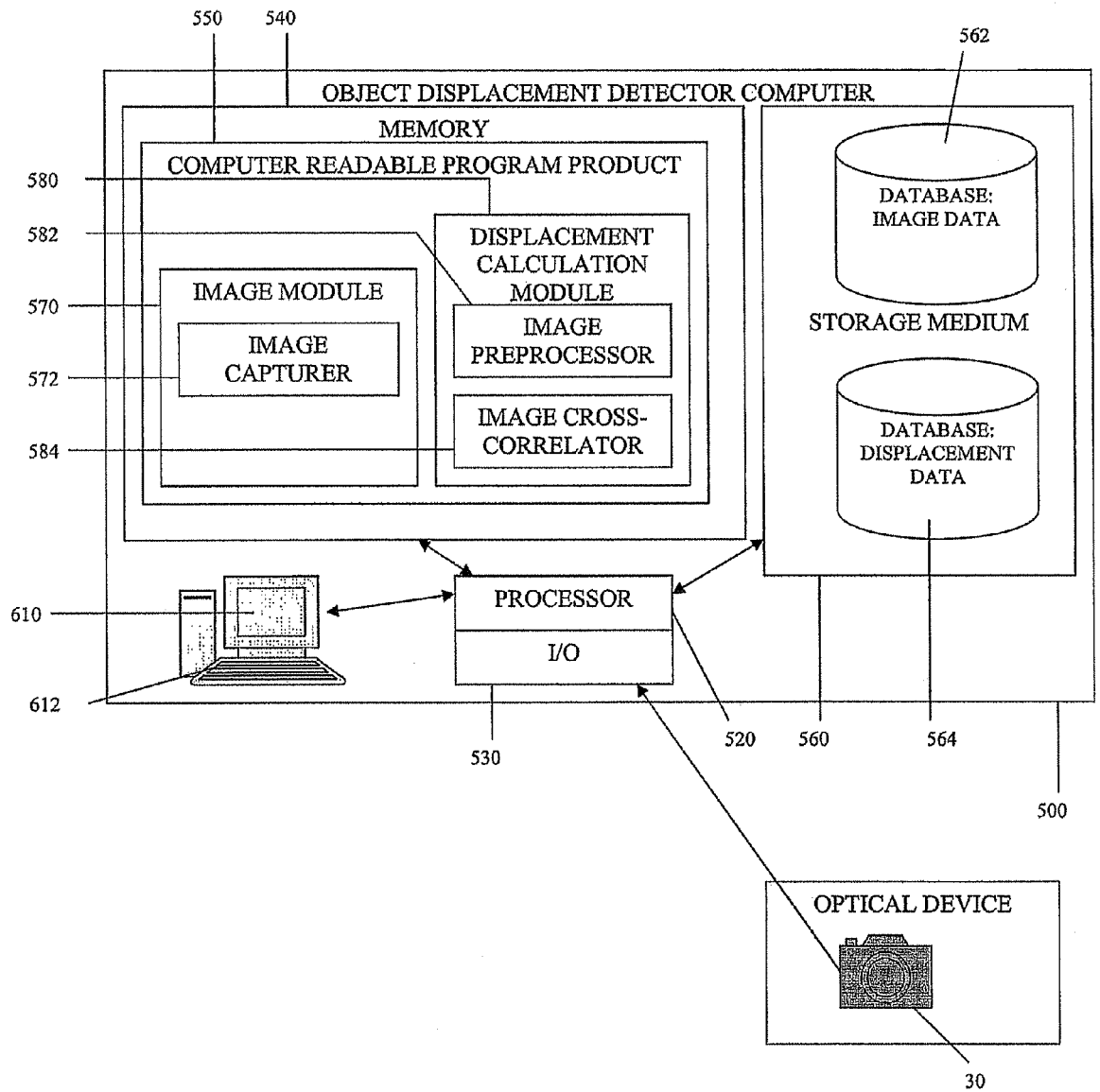
FIG. 6 is schematic block diagram illustrating an exemplary system architecture of a system to measure the displacement of an object with micron-level accuracy in accordance with an embodiment of the present invention.

As is perhaps best illustrated in FIG. 1 and FIG. 6, embodiments of the present invention provide, for example, a computer implemented method to measure the displacement of an object located at a long range with micron-level accuracy can include the steps of selecting a portion from the first numerical function 130, representing a first image at a first position, with a window function to extract a portion of the first numerical function 130 and storing the extracted portion 140, obtaining a subsequent image of the identifier on the object at a subsequent position 150, calculating a peak value "Cpeak" for the cross-correlation coefficient between the images 190, calculating the number of pixels the first image in the first position moved with $1/100^{th}$ of a pixel accuracy 220, and calculating the displacement of the object with micron level accuracy 230. Accordingly, various embodiments of the present invention ultimately measure the displacement of an object located at long range with micron-level accuracy.

According to an embodiment of the present invention, the step of selecting a window from a first image at a first position to extract a function portion 130 can include the steps of obtaining a first image of the identifier on the object at a first position 110, and converting the image into an array that can be represented as a numerical function "f" 120 for analysis.

Extracted function portion, as used throughout, refers to the portion of the first numerical function "f" selected by the window.

The step of calculating a peak value for the cross-correlation coefficient between the images to determine a relative pixel location 190 can, for example, include the steps of converting the subsequent image of the identifier located on the object at a second position, at a time later than for the first image, into an array that can be represented as a numerical function "g" 160, preprocessing the extracted function portion and the numerical function "g" 170, and calculating the cross-correlation coefficient between the extracted function portion and function "g" with an algorithm 180. Preprocessing includes smoothing the extracted function portion and "g" by removing spurious vectors to facilitate the identification of the peak value for the cross-correlation coefficient. More specifically, the image vectors can be preprocessed by removing length scales larger than the height of the window "w" used to obtain the extracted function portion. This enhances the accuracy of the algorithm. To remove these spurious length scales from the vectors, the average value of each vector, over the window "w" shifted at each offset, is subtracted from each point in the vector. Essentially, each vector is smoothed with the window "w" and the smoothed vectors are then subtracted from the original vectors resulting in the following for the functions: $f=f-(f*w)$ and $g=g-(g*w)$. The preprocessing step can then help make the process be more robust with respect to noise, and is not significantly expensive because it is based on FFT-based correlations.

As used throughout, the term cross-correlation coefficient is a measure of the similarity between two sets of data, for example, the similarity between the function portion extracted from numerical function "f", and the numerical function "g." Accordingly, the peak value for the cross-correlation coefficient indicates the point at which the highest degree of similarity between the function portion extracted from function "f", and function "g" occurs and can be, for example, calculated using the mathematical algorithm shown above in Eq. 5 and repeated below for convenience:

$$C_\Delta = \frac{\sum_{i=w_1}^{w_1+n} f_i g_{i+\Delta}}{\sqrt{\left(\sum_{i=w_1}^{w_1+n} f_i^2\right)\left(\sum_{i=w_1}^{w_1+n} g_{i+\Delta}^2\right)}} = \frac{(f \cdot w) * g}{\sqrt{(f^2 \cdot w)(g^2 * w)}}$$

In the foregoing cross-correlation equation, the similarity between the function portion extracted by the window ($f \cdot w$) and function g determines the value of $C_\Delta$ as the equation is applied at each pixel increment $i+\Delta$.

Additionally, the step of calculating the number of pixels the first image in the first position moved with $1/100^{th}$ of a pixel accuracy 220 can include the steps of obtaining two points adjacent and to either side of the peak value for the cross-correlation coefficient $C_{peak}$ 200, and fitting a curve, for example, a $2^{nd}$ order equation such as a parabola, through the peak value for the cross-correlation coefficient $C_{peak}$ and the two adjacent points 210. This $2^{nd}$ order curve fit determines where the refined peak correlation $C_{refined}$ value would be if it was measurable and thus refines the relative pixel location corresponding to the $C_{peak}$ value. Once the displacement is calculated in pixels based on the refined pixel location, the displacement in units of measurement can be calculated with micron-level accuracy, for example, by dividing the displacement of the object by a factor such as pixels per inch (PPI) 230.

According to an embodiment of the present invention, the additional step of correcting for noise, vibration, or camera movement 240 can be applied to the method. This step can include applying all the steps described above to the identifier on a fixed reference surface and then subtracting the resulting peak correlation coefficient value from the peak correlation coefficient for the identifier on the object. Accordingly, this step can correct aspects of the peak correlation value due to interference such as noise, vibration, or camera movement. Once the object's displacement is determined, the object can be, for example, moved to a desired position based on that measurement. Also as an example, an alarm or other form of notice can be issued in response to the object's displacement.

FIG. 5, for example, is an illustration of a simplified system to measure the displacement of an object located in a hazardous or otherwise inaccessible location. An identifier 10 located on an object 12 is located in a hazardous or otherwise inaccessible location 20. The identifier 10 includes a plurality of stripes with random widths at random spacing (FIG. 2A) that can be imaged by an optical device 30 such as a camera mounted to a surface 32. Images of the identifier 10 can provide the system with the input to determine the displacement of the object 12. The optical device 30 can also image another identifier 40 located on a fixed surface 42 to provide a reference point for the system. The reference identifier 40 includes of a plurality of stripes with random widths at random spacing (FIG. 3) and can correct camera 30 movement or any other image noise encountered when imaging the identifier 10 on the object 12. Alternatively, the identifiers 10, 40 can be, for example, drawn, engraved, or painted onto the surface of the object 12 and onto the fixed reference surface 42, respectively. The dimensions of the stripes on the identifiers 10, 40 can be such that the optical device 30 can resolve the images of the identifiers. Stripes can have a height of 1 inch, and a maximum width of 1 inch.

An object displacement detector computer 500 that can include a computer processor 54 and a video monitor 52 captures and processes the image data obtained by the optical device 30. The detailed system according to an embodiment of the present invention is explained in FIGS. 6 and 7.

Figure 2A:
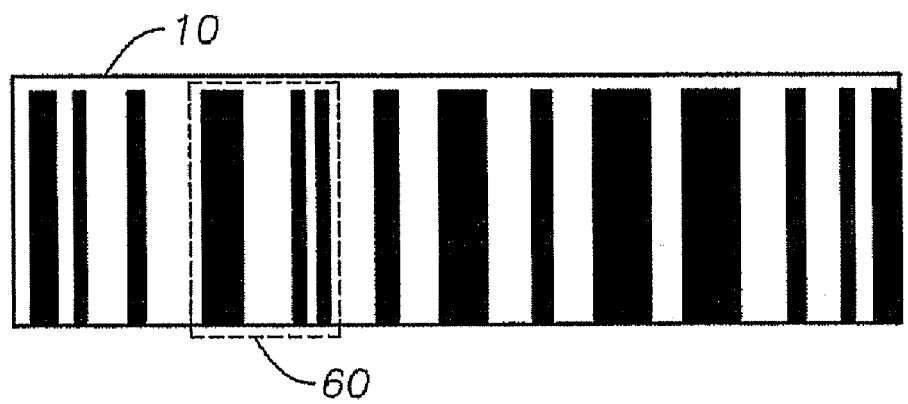
FIG. 2A is a schematic diagram illustration of an identifier located on an object at a first position in accordance with an embodiment of the present invention.
Figure 2B:
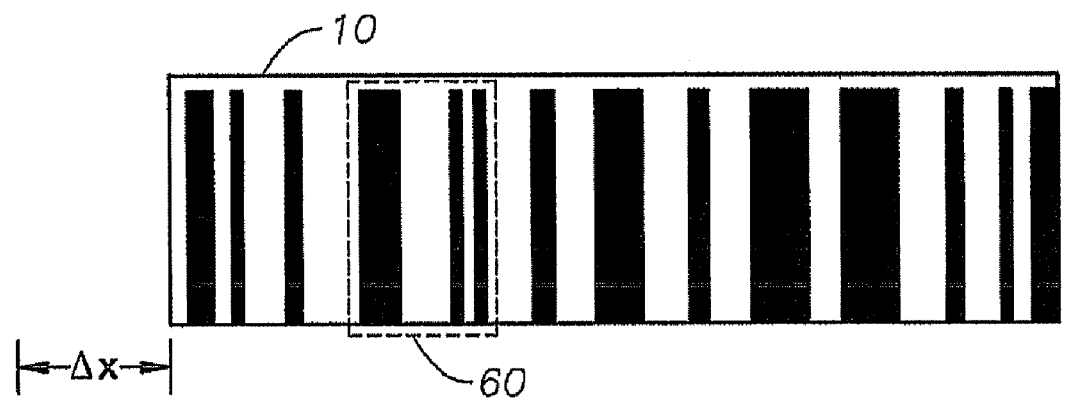
FIG. 2B is a schematic diagram illustration of an identifier located on an object at a subsequent position after displacement in accordance with an embodiment of the present invention.
Figure 3:
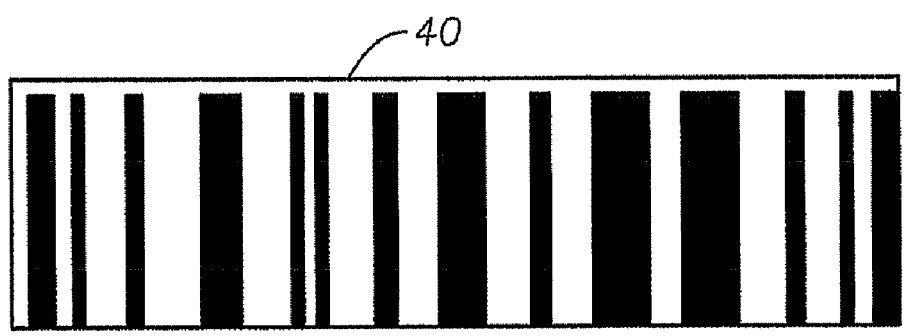
FIG. 3 is a schematic diagram illustration of an identifier located on a fixed surface in accordance with an embodiment of the present invention.

FIGS. 2A and 2B illustrate an exemplary identifier 10. The identifier 10 is attached to an object 12 (FIG. 1) whose displacement is to be measured. As explained earlier, the identifier 10 includes of a plurality of stripes with varying widths at random spacing. The varying stripe widths and random stripe spacing prevents interference between the stripe spacing and the image pixels of the optical device 30 (FIG. 1) by avoiding a one-to-one pattern match between the stripes and pixels.

As shown in FIG. 2A, a first image of the identifier 10 in a first position is obtained by the optical device 30 (FIG. 1). The first image at a first position can be represented, for example, as a numerical function "f" as shown Eq. 5 above and in graphical form in FIG. 4A by plotting pixel intensity values at each pixel along the length of the identifier 10. The plot of function "f" is used for general illustrative purposes of an image's numerical representation and may or may not actually represent the image of the identifier 10 shown in FIG. 2A. The intensity values that produce the peaks and valleys in the plots are generated by how much of a pixel is used when a stripe in the image lands on a pixel. Pixel usage can be partial because a pixel can have an intensity value from 0 (completely white) to 255 (completely dark) depending on how much of a stripe occupies a pixel. A window 60 can be used, for example, to select and extract a portion of the function "f" that represents a portion of the first image of the identifier 10 at a first position as shown in the window 60 in FIG. 2A. The function portion extracted by the window 60 is shown in FIG. 4A by itself.

FIG. 2B shows a subsequent image of the identifier 10 at a second position with an unknown displacement Δx. This displacement is also shown exaggerated in FIG. 1 for the displacement of an object 12 as the system of the present invention can detect small displacements in the order of a fraction of an inch or larger displacements such as 4 feet where nevertheless, micron-scale accuracy is important. As with the first image of the identifier 10, the subsequent image at a second position can be represented, for example, as a numerical function "g" as shown in FIG. 4C by plotting pixel intensity values at each pixel along the length of the identifier 10. In this case, it can be observed that the function portion extracted from "f" can be found in "g" shifted 200 units to the right. Although this embodiment describes a horizontal displacement Δx, which is perpendicular to the line of sight of an optical device, the identifiers 10, 40 can be, for example, oriented along an axis vertical with the object, such as the y-axis, which is also perpendicular to the line of sight. The multiple orientations would allow the system, computer readable program product, and computer-implemented methods to measure an object's displacement along multiple axes.

FIG. 4D shows the unnormalized comparison between the function portion extracted from the function "f" in the first position with function "g" shown in FIG. 4C. This comparison is known as a cross-correlation coefficient as described in Eq. 5 above. The function portion extracted from "f" is essentially superimposed on function "g" and offset one pixel at a time until the peak cross-correlation coefficient is obtained. In this case, the peak cross-correlation coefficient results at 200 units to the right, which is confirmed by the fact that the function portion extracted from "f" could found to be located in "g" shifted 200 units to the right by visual inspection (FIG. 4C.). Normalization of the cross-correlation coefficient results in a more prominent peak cross-correlation value, and thus more reliable indicator, as shown in FIG. 4E.

To account for noise and distortion attributable to movement of the optical device 30, images of the identifier 40 on the fixed reference surface 42 are obtained and their numerical functions are processed in the same manner as those for the displaced object 12. The peak cross-correlation coefficient result for the fixed identifier 40 can then be subtracted from the peak cross-correlation coefficient result for the identifier 10 located on the monitored object 12. Thus the identifier 40 on the fixed surface 42 can serve as a reference for measuring the displacement of the object 12 via the identifier 10 located thereon.

Once the corrected peak cross-correlation value for the identifier 10 on the object 12 is obtained, the pixel at which the peak value occurs is, for example, identified within $\frac{1}{10}^{th}$ of a pixel. Further, a curve can be fit through the peak correlation value by selecting two correlation values adjacent and to either side of the peak correlation value to approximate where the refined pixel location occurs within $\frac{1}{100}^{th}$ pixel (micron-scale) accuracy. This curve fit can be, for example, a $2^{nd}$ order curve fit (parabola) fit to three points around the peak and determines where the refined pixel location would be if it was measurable. Once the refined pixel location is ascertained, a displacement of the object in units, such as inches or centimeters, can be obtained with micron-level accuracy by dividing the pixel value by the number of pixels moved per a unit of measure, for example, 300 pixels per inch (ppi).

Various exemplary embodiments of the present invention can also include a system to measure the displacement of an object 12 (FIG. 1) with micron-level accuracy. FIG. 6, for example, is a schematic block diagram of a system to measure the displacement of an object 12 (FIG. 1) with micron-level accuracy where the object 12 is located in a hazardous or otherwise inaccessible location 20 (FIG. 1) according to an embodiment of the present invention. Specifically, a system as illustrated in FIG. 6 can include an optical device 30, and an object displacement detector computer 500 having at least a processor 520 with Input/Output capability 530, a memory element 540, and a computer readable program product 550 stored in the memory element 540 of the object displacement detector computer 500. According to this embodiment of the invention, the optical device 30 is located at a long range from a hazardous or otherwise inaccessible location 20 where the object 12 is located (FIG. 1), and is remote and in communication with the object displacement detector computer 500.

Also according to an embodiment of the present invention, the computer readable program product 550 can include, for example, an image module 570 and a displacement calculation module 580. The image module 570 can further include, for instance, an image capturer 572 to capture the image data from the images of the identifiers 10, 40 attached to the object 12 and the fixed surface 42, after they are obtained by the optical device 30. The image capturer 572 is adapted to convert the images of the identifiers into numerical functions based on the pixels occupied by the stripes on the identifiers. The displacement calculation module 580, according to an embodiment of the present invention can, for instance, include an image preprocessor 582 to smooth the image numerical functions by removing image vectors that produce spurious intensity peaks and thus facilitates the identification of peak values during cross-correlation.

Figure 4:
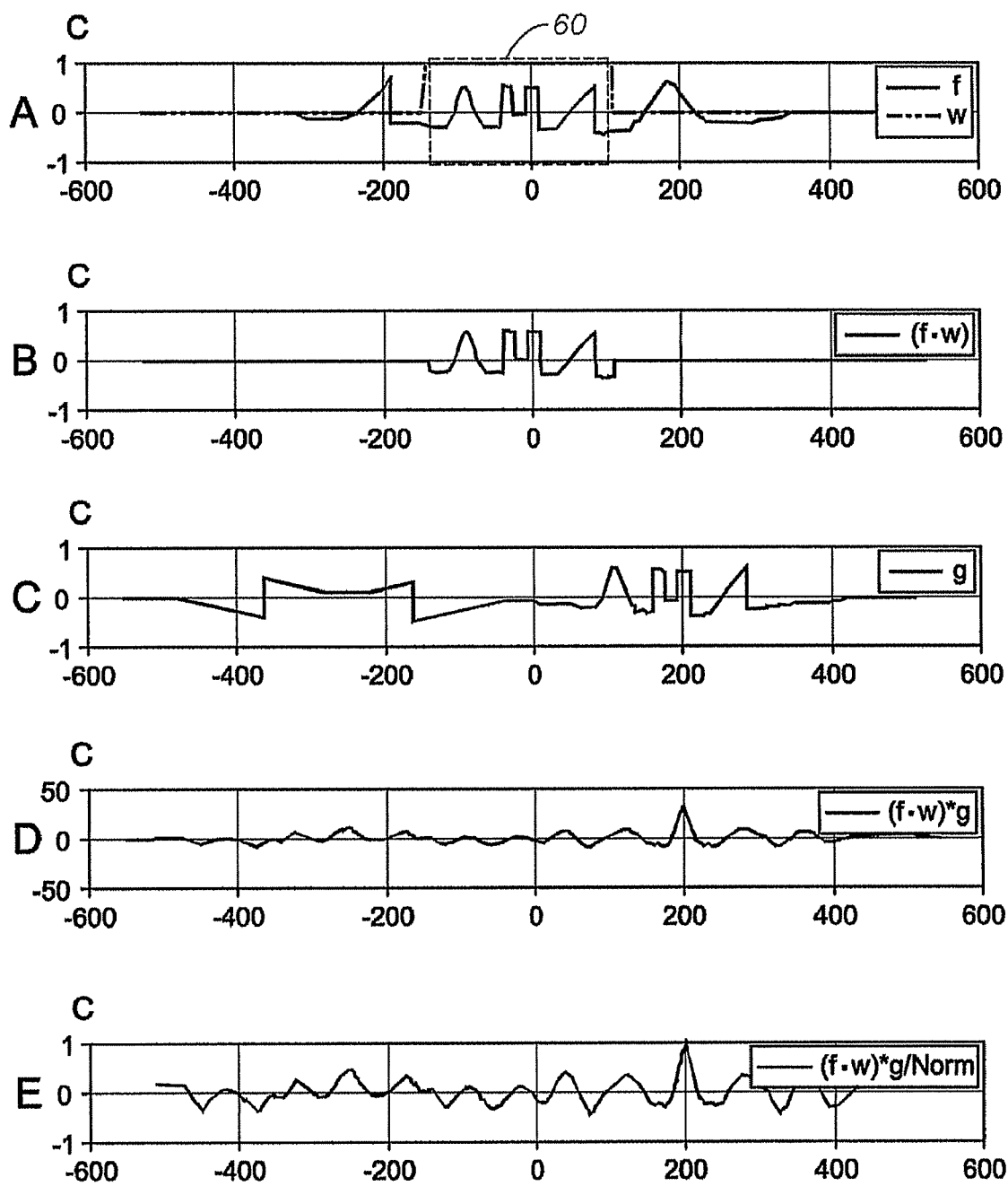
FIGS. 4A-E illustrate five graphs showing numerical functions that represent images of an identifier located on object in accordance with an embodiment of the present invention.

The displacement calculation module 580 can also beneficially include an image cross-correlator 584 adapted to perform the operations of comparing a function portion extracted from a first numerical function for an identifier 10, 40 to a subsequent numerical function "g" (FIG. 4) of the same identifier. The first numerical function representing the first image is denoted as "f" (FIG. 4). The image cross-correlator 584 can further be adapted to perform the operations of calculating and identifying the peak cross-correlation value between the function portion extracted from the first numerical function and the subsequent image numerical function as the extracted function portion is shifted pixel by pixel in one axis, as the cross-correlation algorithm shown in Eq. 5 is applied. Further, the image cross-correlator 584 can perform the operations of curve-fitting a polynomial around the peak correlation value to ascertain the refined pixel location within $\frac{1}{100}^{th}$ of a pixel accuracy that corresponds to a refined peak correlation value. The refined pixel location can then be used to determine the number of pixels the object moved and, in this example, the number of pixels can then be multiplied by a factor of a unit of measurement per pixel to obtain a displacement in units such as inches or centimeters. Moreover, the image cross-correlator 584 can subtract the result for the fixed identifier 40 from the peak cross-correlation coefficient result for the identifier 10 on the monitored object 12 to account for any noise and distortion attributable to movement of the optical device 30.

The object displacement detector computer 500, according to an embodiment of the present invention, can further include a computer readable storage medium 560. The computer readable storage medium 560 can further include at least one database including an image data database 562 and a displacement data database 564, the image data database 562 including a plurality of images and image data, and the displacement data database 564 including a plurality of displacement measurements for the monitored object 12 (FIG. 1). Also according to an embodiment of the present invention, the image capturer 572 can store images and image data in the image data database 562, the image preprocessor 582 can store preprocessed image numerical functions in the image data database 562, and the image cross-correlator 584 can store the calculated peak correlation values and the object displacement values in the displacement data database 564.

Additionally, according to an embodiment of the present invention, the object displacement detector computer 500 can further include a graphical user interface device 610 and a user input device 612. Accordingly, the image capturer 572 can display via the graphical user interface device 610 of the object displacement detector computer 500 the images and image data for the identifiers 10, 40 (FIG. 1). Further, the image cross-correlator 584 can display via the graphical user interface device 610 of the object displacement detector computer 500 the displacement of the monitored object 12 (FIG. 1) and can receive input data via the user input device 612 of the object displacement detector computer 500 from a user indicating whether to initiate the displacement measurement process. Accordingly, a user can initiate the displacement measurement process by instructing the optical device 30 to take a series of images of the identifier 10 on the object 12 (FIG. 1), and of the identifier 40 on the fixed reference surface 42 (FIG. 1). The user can utilize the user input device 612 to transmit a command or set of commands to the optical device 30 to perform the imaging process.

Figure 7:
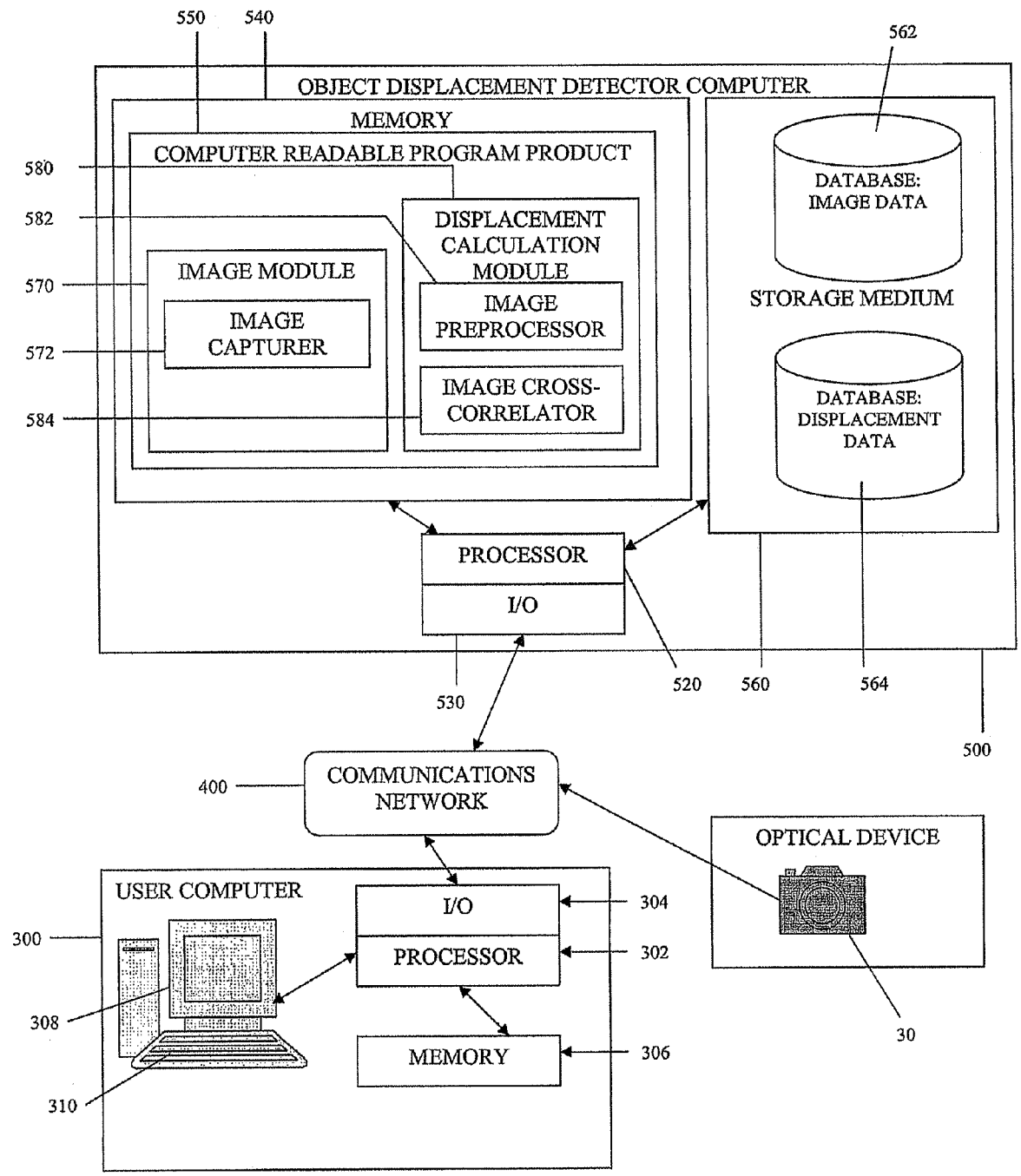
FIG. 7 is schematic block diagram illustrating another exemplary system architecture of a system to measure the displacement of an object with micron-level accuracy in accordance with an embodiment of the present invention.

A system to measure the displacement of an object 12 (FIG. 1) with micron-level accuracy can also include, for example, a communications network 400. For instance, FIG. 7 illustrates an example of a system to measure the displacement of an object 12 (FIG. 1) with micron-level accuracy where the object displacement detector computer 500 receives images from the optical device 30 via a communications network 400. Further, a user computer 300 can include, for example, a processor 302, input/output capabilities 304, and memory 306, and transmits commands to the object displacement detector computer 500 via a communications network 400. The user computer 300, in this embodiment, can further include, for example, a graphical user interface device 308 and a user input device 310. The primary difference between FIG. 6 and FIG. 7 is the addition of the communications network 400 to the system in FIG. 7. According to an embodiment of the present invention, the optical device 30 can be controlled by commands issued through the user computer 300 via the communications network 400 and the image capturer 572 can transmit images and image data via the communications network 400 for display in the graphical user interface device 308 of the user computer 300. Additionally, the image cross-correlator 584 can receive input data through the user input device 310 of the user computer 300 via the communications network 400 and can transmit the displacement of the monitored object 12 (FIG. 1) via the communications network 400 for display in the graphical user interface device 308 of the user computer 300. The communications network 400 can be any network that allows communication between computers and devices such as, for example, a LAN, WAN, internet, Wi-Fi, or wireless networks.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

That claimed is:

1. A computer implemented method to detect displacement of objects from a long range, the computer implemented method comprising the steps of:
    determining a cross-correlation between at least a portion of a first numerical function and a second numerical function by shifting a pixel at a time the portion of the first numerical function over the second numerical function to thereby determine the cross-correlation as a cross-correlation numerical value, the first numerical function derived from a first image of an identifier located on an object to be tracked when located at a first position, the second numerical function derived from a second image of the identifier located on the object to be tracked when located at a second position, the second image taken at a time temporally later than a time for the first image, the first image and the second image obtained by an optical device, the cross-correlation numerical value determined between the first image and the second image at a pixel produced by the optical device;
    repeating the step of determining the cross-correlation between the portion of the first numerical function and the second numerical function by shifting the portion of the first numerical function over the second numerical function by a pixel offset to thereby generate a plurality of cross correlation numerical values where each cross-correlation numerical value corresponds to a distinct pixel;
    comparing the plurality of cross-correlation numerical values to thereby determine a relative pixel location at which a peak cross-correlation value occurs;
    fitting a curve through the peak cross-correlation value by selecting two cross-correlation values adjacent and to either side of the peak cross-correlation value to refine the determined relative pixel location;
    determining a number of pixels the portion of the first numerical function moved that resulted in the peak cross-correlation value with the second numerical function, the peak cross-correlation corresponding to the refined relative pixel location; and
    determining a displacement of the object to be tracked by dividing the number of pixels that the portion of the first numerical function moved by a pixel per measurement unit, the displacement being perpendicular to a line of sight with respect to the optical device.

2. A computer implemented method as defined in claim 1, further comprising the steps of:
    converting the first image of the identifier located on the object to be tracked into the first numerical function, the object being at the first position;
    selecting a portion of the first numerical function by using a window function to thereby extract the portion of the first numerical function;
    removing noise from the portion of the first numerical function selected by the window function;
    converting the second image of the identifier located on the object to be tracked into the second numerical function, the object being at the second position; and
    removing noise from the second numerical function.

3. A computer implemented method as defined in claim 2, wherein the step of converting the first image of the identifier located on the object to be tracked comprises the steps of:
- converting the first image of the identifier located on the object to be tracked into a first numerical array, and
- converting the first numerical array into the first numerical function.

4. A computer implemented method as defined in claim 2, wherein the step of removing noise from the portion of the first numerical function selected by the window function comprises the steps of:
- calculating at each pixel offset an average value for an image vector having a magnitude that exceeds the magnitude of a plurality of vectors found in the portion of the first numerical function extracted from the first numerical function; and
- subtracting at each pixel offset the average value of each image vector from each original vector in the portion of the first numerical function extracted from the first numerical function.

5. A computer implemented method as defined in claim 2, wherein the step of removing noise from the second numerical function comprises the step of:
- subtracting at each pixel offset the calculated average value of each image vector from each original vector in the second numerical function.

6. A computer implemented method as defined in claim 1, wherein the step of determining the cross-correlation between the portion of the first numerical function and the second numerical function by shifting the portion of the first numerical function over the second numerical function by a pixel offset to thereby generate a plurality of cross correlation numerical values where each cross-correlation numerical value corresponds to a distinct pixel, comprises the steps of:
- a. overlapping the portion of the first numerical function over the second numerical function and offsetting the portion of the first numerical function by one pixel to define a pixel offset;
- b. executing a cross-correlation algorithm between the portion of the first numerical function and the second numerical function at the pixel offset to calculate the first of a plurality of cross-correlation values;
- c. storing the cross-correlation value at the pixel offset for comparison;
- d. repeating steps a-c until the function portion extracted from the first numerical function is offset through the last pixel of the second numerical function;
- e. normalizing the cross-correlation value results.

7. A computer implemented method as defined in claim 1, wherein the curve fit through the peak cross-correlation value and two cross-correlation values adjacent and to either side of the peak correlation value is a $2^{nd}$ order polynomial;
wherein the displacement measurement is corrected for distortion by subtracting a peak-cross-correlation value for an identifier located on a fixed reference surface from the peak cross-correlation value for the identifier located on the object to be tracked, and
wherein the steps to determine the peak cross-correlation value for the fixed reference surface are substantially the same as the steps used to obtain the peak cross-correlation value for the identifier located on the object to be tracked.

8. A computer implemented method as defined in claim 1, wherein determining the displacement of the object is for an object located in one or more of the following locations:
- a radioactive location;
- a chemically reactive location,
- a high voltage location,
- a hazardous location; and
- inaccessible location;

wherein the object is located at least 100 yards from the optical device;
wherein the determined object displacement is in an axis perpendicular to the line of sight between the object and the optical device; and
wherein one or more of the following actions is taken in response to the calculated displacement:
- the object is moved to a desired position;
- a notice is issued by a warning system; or
- an alarm is issued by an alarm system.

9. A computer implemented method as defined in claim 8, wherein the determined object displacement is in an axis vertical to the object.

10. A computer implemented method as defined in claim 1,
wherein the determination of the number of pixels the portion of the first numerical function moved that resulted in the peak cross-correlation value with the second numerical function has an accuracy of at least $1/100^{th}$ of a pixel; and
wherein the accuracy of the determined displacement of the object is at least 0.02 microns.

11. A computer implemented method as defined in claim 1, wherein the computer implemented method further includes the steps of:
- storing the images and image data in a first database stored on a computer readable storage medium of the computer;
- storing the numerical functions of the images in the first database stored on a computer readable storage medium of the computer;
- storing the numerical functions of the images in the first database stored on a computer readable storage medium of the computer, the noise being removed from the numerical functions;
- storing the cross-correlation values in a second database stored on a computer readable storage medium of the computer;
- storing the object displacement data in pixels in the second database stored on a computer readable storage medium of the computer; and
- storing the object displacement data in units of measurement in the second database stored on a computer readable storage medium of the computer.

12. A system to detect the displacement of objects from a long range, the system comprising:
- an optical device for obtaining a first image and a second image of an identifier located on an object to be tracked;
- a computer in communication with the optical device and having a processor and a memory element; and
- a program product stored in the memory element of the computer, the program product comprising:
  - an image capturer configured to capture the first image and the second image of the identifier located on the object to be tracked to thereby convert the first image into a first numerical function and the second image into a second numerical function, the first image and the second image obtained by the optical device;
  - an image preprocessor configured to remove noise from the first numerical function and the second numerical function by removing a plurality of image vectors from each of the first and the second numerical functions;

an image cross-correlator configured to compare a portion of the first numerical function for the identifier located on the object to be tracked to the second numerical function of the same identifier to thereby determine a peak cross-correlation value between the portion of the first numerical function and the second numerical function at a pixel generated by the optical device, the portion of the first numerical function defining an extracted function portion of the first numerical function; the image cross-correlator comparing by shifting the portion of the of the first numerical function pixel by pixel in an axis to thereby determine a cross-correlation value at each pixel and thereby generate a plurality of cross-correlation values, the peak cross-correlation peak value chosen from among the plurality of cross-correlation values to determine a relative pixel location, the image cross-correlator further configured to fit a curve around the peak correlation value to determine a refined pixel location, the image cross-correlator further configured to determine a displacement of the object to be tracked by utilizing the refined pixel location to determine a number of pixels the extracted portion of the first numerical function moved that resulted in the peak correlation value with the second numerical function; and the image cross-correlator further configured to determine a displacement of the object to be tracked by dividing the number of pixels that the extracted portion of the first numerical function moved by a pixel per unit of measurement, the displacement being perpendicular to a line of sight with respect to the optical device.

13. A system as defined in claim 12, wherein the optical device further obtains a first image and a second image of an identifier located on a fixed reference surface;

wherein the image capturer is further configured to capture the first image of the identifier located on the fixed reference surface to thereby convert the first image into a first numerical function, the first image obtained by the optical device;

wherein the image capturer is further configured to capture the second image of the identifier located on the fixed reference surface to thereby convert the second image into a second numerical function, the second image obtained by the optical device;

wherein the image cross-correlator is further configured to correct for distortion in the displacement measurement by:

determining a peak-cross-correlation value for the identifier located on the fixed reference surface; and subtracting the peak-cross-correlation value for the identifier located on the fixed reference surface from the peak cross-correlation value for the identifier located on the object to be tracked;

wherein the optical device is one or more of the following:
a digital camera; or
a charge coupled device camera;

wherein the digital camera has a field of view that obtains images of objects that move between 0.1 inches to 2 inches; or wherein the charge coupled device camera has a field of view that obtains images of objects that move between 0.1 inches to 2 inches;

wherein the identifier located on the object to be tracked includes a plurality of darkened stripes of random width and random spacing; and wherein the identifier located on the fixed reference surface includes a plurality of darkened stripes of random width and random spacing;

wherein the stripes on the identifier located on the object to be tracked have a height of 1 inch and a maximum width of 1 inch;

wherein the stripes on the fixed reference surface have a height of 1 inch and a maximum width of 1 inch.

14. A system as defined in claim 12, further comprising:
a computer readable storage medium storing a plurality of images and image data for each of the object to be tracked and the fixed reference surface, a plurality of image numerical functions, and a plurality of cross-correlation data and displacement data.

15. A system as defined in claim 12, wherein the images and image data for the object to be tracked and the fixed reference surface stored on the computer readable storage medium is for a plurality of images obtained by the optical device.

16. A system as defined in claim 12,
wherein the computer further includes a graphical user interface device and a user interface input device;
wherein the image capturer is further configured to display via the graphical user interface of the computer the images taken by the optical device; and
wherein image cross-correlator is further configured to display via the graphical user interface device of the computer the numerical functions that represent images, cross-correlation values, peak cross-correlation value, refined peak-cross correlation value, displacement in pixels, and displacement of the object in units of measure.

17. A system as defined in claim 16, wherein the image cross-correlator is further configured to normalize the cross-correlation coefficient results.

18. A system as defined in claim 16, wherein the computer is a first computer the system further comprising a second computer having at least a processor and a memory element, wherein the graphical user interface and the user input device are located on the second computer, and wherein the second computer is in communication with the first computer.

19. A system as defined in claim 18, further comprising a third computer wherein the computer readable storage medium is stored on the third computer accessible by the first computer and the second computer.

20. A system as defined in claim 18, wherein the first computer and second computer are positioned to communicate via a communications network; and
wherein the optical device is positioned to communicate with the first computer and the second computer via the communications network.

21. A system as defined in claim 12, wherein the image cross-correlator is further configured to determine the displacement of the object within one of the following:
at least $1/100^{th}$ of a pixel accuracy; or
at least 0.02 micron accuracy.

22. Program product to detect the displacement of objects from a long range, the program product stored in a tangible computer readable storage medium and including instructions that when executed by a computer, cause the computer to perform the operations of:
converting a first image of an identifier into a first numerical function and a second image of the identifier into a second numerical function, the identifier located on an object to be tracked, the first numerical function derived from a first numerical array representing the first image of the identifier located on the object to be tracked when located at a first position, the second numerical function derived from a second numerical array representing the second image of the identifier located on the object to be tracked when located at a second position, the first and second numerical arrays each derived from a plurality of pixels occupied by a plurality of stripes on the identifier located on the object to be tracked, the pixels generated by an optical device, the stripes being of random width and having random spacing, the second image taken at a time temporally later than a time for the first image, the first image and the second image of the identifier located on the object to be tracked obtained by the optical device;

obtaining a portion of the first numerical function for comparison with the second numerical function, by extracting the portion from the first numerical function with a window function having a length and a height;

removing a plurality of image vectors from the first numerical function and a plurality of image vectors from the second numerical function of the identifier located on the object to be tracked to facilitate the identification of a peak cross-correlation value, the removed image vectors having a magnitude exceeding the height of the window function used to extract the portion of the first numerical function;

determining a relative pixel location at which a peak cross-correlation value occurs by comparing the portion extracted from the first numerical function to the second numerical function of the same identifier located on the object to be tracked, comparing including shifting portion extracted from the first numerical function pixel by pixel over the second numerical function in an axis perpendicular to a line of sight of the optical device to thereby generate a cross-correlation value at each pixel, the relative pixel location at which the peak cross-correlation value determined from among the cross-correlation values generated at each pixel;

fitting a polynomial around the determined peak cross-correlation value to refine the determined relative pixel location at which the peak cross-correlation value occurs;

determining a number of pixels the portion of the first numerical function moved that resulted in the peak cross-correlation value with the second numerical function, the peak cross-correlation corresponding to the refined relative pixel location; and determining a displacement of the object to be tracked by dividing the number of pixels that the portion of the first numerical function moved by a pixel per measurement unit, the displacement being perpendicular to a line of sight with respect to the optical device.

23. A program product as defined in claim 22,
wherein the operation of converting the images is performed by one of the following optical devices:
  a digital camera, or
  a charge coupled device camera;
wherein the accuracy of the determined displacement of the object is one of the following:
  at least $1/100^{th}$ of a pixel accuracy; or
  at least 0.02 micron accuracy; and
wherein the operation of determining displacement further includes the operations of:
  determining a peak cross-correlation value for an identifier located on a fixed reference surface;
  subtracting the determined peak cross-correlation value for the identifier on the fixed reference surface from the determined peak cross-correlation value for the identifier located on the object to be tracked to correct the displacement measurement of the object for distortion.

24. A computer readable program product as defined in claim 22,
wherein the operation of converting a first image into a first numerical function and a second image into a second numerical function of the identifier located on the object to be tracked is executed in response to an input via a user interface device initiating the displacement determination;
wherein the operations of the program product are performed by a first computer in communication with a second computer;
wherein the operation of converting a first image into a first numerical function and a second image into a second numerical function of the identifier located on the object to be tracked is performed by the optical device, the optical device in communication with the first computer and the second computer;
wherein the operation of removing a plurality of image vectors from the first numerical function and a plurality of image vectors from the second numerical function of the identifier located on the object to be tracked further comprises instructions that when executed by the first computer cause the first computer to perform the operations of:
  calculating at each pixel offset the average value of each image vector having a magnitude that exceeds the magnitude of the vectors found in the portion extracted from the first numerical function by the window function; and
  subtracting at each pixel offset the average value of each image vector from each original vector;
wherein the operation of determining a displacement of the object to be tracked is performed for an object located in one of the following locations:
  a radioactive location;
  a chemically reactive location,
  a high voltage location,
  a hazardous location; or
  inaccessible location.

25. A computer readable program product as defined in claim 22,
wherein determining a peak cross-correlation value between the function portion extracted from the first numerical function and a second numerical function to thereby determine a relative pixel location includes instructions that when executed by the computer cause the computer to perform the operations of:
  applying an algorithm utilizing the following equation:

$$C_\Delta = \frac{\sum_{i=w_1}^{w_1+n} f_i g_{i+\Delta}}{\sqrt{\left(\sum_{i=w_1}^{w_1+n} f_i^2\right)\left(\sum_{i=w_1}^{w_1+n} g_{i+\Delta}^2\right)}},$$

the terms of the numerator substituted by using the following equation for increased calculation efficiency:

$$f * g = \sum_{i=w_1}^{w_1+n} f_i g_{i+\Delta} = \mathfrak{F}^{-1}\{\mathfrak{F}(f)\mathfrak{F}(g)^*\},$$

the terms of the denominator substituted by using the following equations for increased calculation efficiency:

$$N_f = \sum_{i=w_1}^{w_1+n} f_i^2 = f^2 \cdot w,$$

$$N_g(\Delta) = \sum_{i=w_1}^{w_1+n} g_{i+\Delta}^2 = g^2 * w,$$

the term substitutions to the numerator and denominator resulting in an efficient cross-correlation equation:

$$C_\Delta = \frac{\sum_{i=w_1}^{w_1+n} f_i g_{i+\Delta}}{\sqrt{\left(\sum_{i=w_1}^{w_1+n} f_i^2\right)\left(\sum_{i=w_1}^{w_1+n} g_{i+\Delta}^2\right)}} = \frac{(f \cdot w) * g}{\sqrt{(f^2 \cdot w)(g^2 * w)}};$$

displaying via a graphical user interface of the computer, the numerical functions that represent images, cross-correlation values, peak cross-correlation value corresponding to the relative pixel location, a refined peak-cross correlation value corresponding to the refined pixel location, displacement in pixels, and displacement in units of measure;

wherein the operations are performed by a first computer that communicates with a second computer via a communications network and the optical device communicates with the first computer and the second computer via the communications network;

wherein displaying information is performed by a graphical user interface of the second computer, the graphical user interface displaying the numerical functions that represent images, the cross-correlation values, the peak cross-correlation value corresponding to the relative pixel location, a refined peak-cross correlation value corresponding to the refined pixel location, the displacement in pixels, and the displacement in units of measure; and wherein the operation of converting a first image into a first numerical function and a second image into a second numerical function of the identifier located on the object to be tracked is executed in response to an input via a user interface device on the second computer initiating the displacement determination.

* * * * *